US008648868B2

(12) United States Patent
Marcu et al.

(10) Patent No.: US 8,648,868 B2
(45) Date of Patent: Feb. 11, 2014

(54) COLOR CORRECTION TO FACILITATE SWITCHING BETWEEN GRAPHICS-PROCESSING UNITS

(75) Inventors: Gabriel G. Marcu, San Jose, CA (US); Steve Swen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 981 days.

(21) Appl. No.: 12/683,138

(22) Filed: Jan. 6, 2010

(65) Prior Publication Data

US 2011/0164051 A1 Jul. 7, 2011

(51) Int. Cl.
*G09G 5/02* (2006.01)
*G06F 15/16* (2006.01)

(52) U.S. Cl.
USPC ........... 345/502; 345/589; 345/590; 345/601; 345/503

(58) Field of Classification Search
USPC .................. 345/601, 602, 590, 502, 503, 589
See application file for complete search history.

(56) References Cited

U.S. PATENT DOCUMENTS 4,102,491 A 7/1978 DeVito
4,862,156 A 8/1989 Westberg
5,341,470 A 8/1994 Simpson
5,943,064 A 8/1999 Hong
5,963,200 A 10/1999 Deering
5,969,728 A 10/1999 Dye
6,067,613 A 5/2000 Balmer
6,229,573 B1 5/2001 Sato
6,385,208 B1 5/2002 Findlater
6,535,208 B1 3/2003 Saltchev
6,557,065 B1 4/2003 Peleg
6,624,816 B1 9/2003 Jones
6,624,817 B1 9/2003 Langendorf
6,738,068 B2 5/2004 Cohen
6,738,856 B1 5/2004 Milley
6,778,187 B1 8/2004 Yi
6,850,240 B1 2/2005 Jones
6,943,667 B1 9/2005 Kammer (Continued)

FOREIGN PATENT DOCUMENTS

CN 1797345 A 7/2006
CN 1892509 A 1/2007

(Continued)

OTHER PUBLICATIONS

Gardner, Floyd M., 'Charge Pump Phase-Lock Loops', IEEE Transactions on Communications, vol. Com-28, No. 11, Nov. 1980, pp. 1849-1858.

(Continued)

*Primary Examiner* — Javid A Amini
*Assistant Examiner* — Scott E Sonners
(74) *Attorney, Agent, or Firm* — Wong, Cabello, Lutsch, Rutherford & Brucculeri, LLP

(57) ABSTRACT

The described embodiments provide a system that facilitates a switch from using a first graphics-processing unit (GPU) to using a second GPU to drive a display. During operation, upon generation of a request to switch from using the first GPU to using the second GPU as a signal source for driving the display, the system obtains a transform (such as a lookup table) that enables the displayed color output from the second GPU to substantially match the displayed color output from the first GPU. The system then makes the transform available for use by the second GPU in driving the display.

29 Claims, 6 Drawing Sheets

(56) References Cited

U.S. PATENT DOCUMENTS

| | | | | |
|---|---|---|---|---|
| 6,943,844 | B2 | 9/2005 | Cahill | |
| 7,039,734 | B2 | 5/2006 | Sun | |
| 7,039,739 | B2 | 5/2006 | Bonola | |
| 7,119,808 | B2 | 10/2006 | Gonzalez | |
| 7,127,521 | B2 | 10/2006 | Hsu | |
| 7,206,004 | B2 | 4/2007 | Toriumi | |
| 7,309,287 | B2 | 12/2007 | Miyamoto | |
| 7,372,465 | B1 | 5/2008 | Tamasi | |
| 7,382,333 | B2 | 6/2008 | Chen | |
| 7,477,256 | B1 | 1/2009 | Johnson | |
| 7,506,188 | B2 | 3/2009 | Krantz | |
| 7,522,167 | B1 | 4/2009 | Diard | |
| 7,545,381 | B2 | 6/2009 | Huang | |
| 7,576,745 | B1 | 8/2009 | De Waal | |
| 7,698,579 | B2 | 4/2010 | Hendry | |
| 7,730,336 | B2 | 6/2010 | Marinkovic | |
| 7,830,389 | B2 | 11/2010 | Maass | |
| 7,839,419 | B2 | 11/2010 | Hanggie | |
| 7,849,246 | B2 | 12/2010 | Konishi | |
| 7,865,744 | B2 | 1/2011 | Lee | |
| 7,882,282 | B2 | 2/2011 | Haban | |
| 7,898,994 | B2 | 3/2011 | Zhao | |
| 8,199,155 | B2 | 6/2012 | Leroy | |
| 8,217,951 | B2 | 7/2012 | Jung | |
| 8,233,000 | B1 | 7/2012 | Diard | |
| 8,508,538 | B2 | 8/2013 | Sakariya | |
| 2002/0033812 | A1 | 3/2002 | Van Vugt | |
| 2002/0163523 | A1 | 11/2002 | Adachi | |
| 2003/0226050 | A1 | 12/2003 | Yik | |
| 2004/0075622 | A1 | 4/2004 | Shiuan | |
| 2004/0207618 | A1 | 10/2004 | Williams | |
| 2005/0012749 | A1 | 1/2005 | Gonzalez | |
| 2005/0030306 | A1 | 2/2005 | Lan | |
| 2005/0093854 | A1 | 5/2005 | Kennedy | |
| 2005/0099431 | A1* | 5/2005 | Herbert et al. | 345/601 |
| 2005/0231498 | A1 | 10/2005 | Abe | |
| 2005/0237327 | A1 | 10/2005 | Rubinstein | |
| 2005/0244131 | A1 | 11/2005 | Uehara | |
| 2005/0285863 | A1 | 12/2005 | Diamond | |
| 2006/0007203 | A1 | 1/2006 | Chen | |
| 2006/0012540 | A1 | 1/2006 | Logie | |
| 2006/0017847 | A1 | 1/2006 | Tardif | |
| 2006/0119603 | A1 | 6/2006 | Chen | |
| 2006/0146057 | A1 | 7/2006 | Blythe | |
| 2006/0267988 | A1 | 11/2006 | Hussain | |
| 2006/0294492 | A1 | 12/2006 | Sakai | |
| 2007/0009444 | A1 | 1/2007 | Yamaguchi | |
| 2007/0094444 | A1 | 4/2007 | Sutardja | |
| 2007/0139422 | A1 | 6/2007 | Kong | |
| 2007/0171230 | A1 | 7/2007 | Iwase | |
| 2007/0279407 | A1 | 12/2007 | Vasquez | |
| 2007/0283175 | A1 | 12/2007 | Marinkovic | |
| 2007/0285428 | A1 | 12/2007 | Foster | |
| 2008/0030509 | A1 | 2/2008 | Conroy | |
| 2008/0030510 | A1 | 2/2008 | Wan | |
| 2008/0034238 | A1 | 2/2008 | Hendry | |
| 2008/0079736 | A1 | 4/2008 | Maass | |
| 2008/0094403 | A1 | 4/2008 | Bakalash | |
| 2008/0117217 | A1 | 5/2008 | Bakalash | |
| 2008/0117222 | A1 | 5/2008 | Leroy | |
| 2008/0129699 | A1 | 6/2008 | Cho | |
| 2008/0168285 | A1 | 7/2008 | deCesare | |
| 2008/0204460 | A1 | 8/2008 | Marinkovic | |
| 2009/0079746 | A1 | 3/2009 | Howard | |
| 2009/0085928 | A1 | 4/2009 | Riach | |
| 2009/0153528 | A1* | 6/2009 | Orr | 345/204 |
| 2009/0153540 | A1 | 6/2009 | Blinzer | |
| 2009/0160865 | A1 | 6/2009 | Grossman | |
| 2010/0083023 | A1 | 4/2010 | Bjegovic | |
| 2010/0083026 | A1 | 4/2010 | Millet | |
| 2010/0091025 | A1 | 4/2010 | Nugent | |
| 2010/0091039 | A1 | 4/2010 | Marcu | |
| 2010/0103147 | A1 | 4/2010 | Sumpter | |
| 2010/0164963 | A1 | 7/2010 | Sakariya | |
| 2010/0164964 | A1 | 7/2010 | Sakariya | |
| 2010/0164966 | A1 | 7/2010 | Sakariya | |
| 2011/0032275 | A1 | 2/2011 | Marcu | |
| 2011/0164045 | A1 | 7/2011 | Costa | |
| 2011/0164046 | A1 | 7/2011 | Niederauer | |
| 2011/0216078 | A1 | 9/2011 | Blinzer | |
| 2012/0092351 | A1 | 4/2012 | Barnes | |

FOREIGN PATENT DOCUMENTS

| | | | |
|---|---|---|---|
| EP | 0272655 | A2 | 6/1988 |
| EP | 0497377 | A2 | 1/1992 |
| EP | 0482678 | A2 | 4/1992 |
| EP | 1061434 | A2 | 12/2000 |
| EP | 1158484 | A2 | 11/2001 |
| EP | 1962265 | A1 | 8/2008 |
| JP | H06006708 | | 1/1994 |
| JP | H06006733 | A | 1/1994 |
| JP | H11331638 | | 11/1999 |
| JP | 2007179225 | | 7/2007 |
| JP | 2008040602 | A | 2/2008 |
| TW | 200809692 | A | 2/2008 |
| TW | 200821984 | A | 5/2008 |
| WO | 02086745 | A2 | 10/2002 |
| WO | 2005059880 | A1 | 6/2005 |
| WO | 2007140404 | A2 | 12/2007 |
| WO | 2008016424 | A1 | 2/2008 |
| WO | 2009038902 | A1 | 3/2009 |

OTHER PUBLICATIONS

Mann, Justin 'Nvidia prepares hybrid SLI technology to save power,' TechSpot.com, Jun. 25, 2007, downloaded from http://www.techspot.com/news/25854-nvid ia-prepares-hybrid-slitechnology-to-save-power.html, Jun. 29, 2009, 3 pages.

NVIDIA Hybrid SLI Technology, Technology Overview, Apr. 2008, v01, 2 pages.

NVIDIA User Guide, Introducing Hybrid SLI Technology, User Guide, May 2008, DS-03957-001_v01, 21 pages.

Notification of the First Office Action dated Oct. 15, 2012 from State Intellectual Property Office of the People's Republic of China, Application No. 200980145376.9.

Office Action issued by Japanese Patent Office on Jan. 21, 2013 in connection with Japanese Application No. 2011-532191.

Office Action received in corresponding U.S. Appl. No. 12/959,051, dated Jan. 4, 2013.

International Search Report received in corresponding International Application No. PCT/US2009/060550, dated Apr. 10, 2010.

International Search Report and Written Opinion received in corresponding PCT Application No. PCT/US2010/061820, dated Apr. 11, 2011.

International Search Report and Written Opinion received in corresponding PCT Application No. PCT/US2010/061814, dated Apr. 11, 2011.

First Office Action received in corresponding KR Application No. 10-2011-7010810, dated Oct. 30, 2012.

Second Office Action received in corresponding CN Application No. 200980145376.9, dated Mar. 19, 2013.

Final Office Action received in corresponding U.S. Appl. No. 12/683,024, dated May 30, 2013.

Office Action received in TW Application No. 099146304, dated Aug. 23, 2013.

Author Unknown, "Serial-MII Specification," Cisco Systems, Inc., Revision 2.1, pp. 1-7, Sep. 10, 2002.

International Search Report received in PCT Application PCT/US2009/069851, dated Aug. 9, 2010.

* cited by examiner

COLOR CORRECTION TO FACILITATE SWITCHING BETWEEN GRAPHICS-PROCESSING UNITS

BACKGROUND

1. Field

The present embodiments relate to techniques for switching between graphics-processing units (GPUs) in a computer system. More specifically, the disclosed embodiments relate to techniques for facilitating seamless switching between GPUs in a computer system by performing color correction to facilitate the switching.

2. Related Art

Power management is critically important for many electronic devices. For example, portable electronic devices such as laptop computers, mobile phones, and personal digital assistants (PDAs) need to conserve power to operate for any length of time on battery power. At the same time, many of these portable electronic devices are beginning to incorporate high-resolution, high-power graphics technology. Rapid developments in this area have led to significant advances in 2D and 3D graphics technology, providing users with increasingly sophisticated visual experiences in domains ranging from graphical user interfaces to realistic gaming environments. Underlying many of these improvements is the development of dedicated graphics-rendering devices, or graphics-processing units (GPUs). A typical GPU includes a highly parallel structure that efficiently manipulates graphical objects by rapidly performing a series of primitive operations and displaying the resulting images on graphical displays.

Unfortunately, there are costs associated with these increased graphics capabilities. In particular, an increase in graphics performance is typically accompanied by a corresponding increase in power consumption. Consequently, many computer systems and portable electronic devices may devote a significant amount of their power to support high-performance GPUs, which may decrease battery life and cause heat dissipation problems.

One solution to this problem is to save power during low-activity periods by switching from a high-power GPU that provides higher performance to a low-power GPU with lower performance. However, a number of GPU initialization operations need to be performed in order to effectively switch between GPUs.

SUMMARY

The disclosed embodiments provide a system that facilitates a switch from using a first graphics-processing unit (GPU) to using a second GPU to drive a display. During operation, upon generation of a request to switch from using the first GPU to using the second GPU as a signal source for driving the display, the system obtains a transform (such as lookup table (LUT)) that enables the displayed color output from the second GPU to substantially match the displayed color output from the first GPU. The system then loads the LUT for use by the second GPU in driving the display.

In some embodiments, obtaining the transform involves:

(i) identifying the second GPU based on the request;

(ii) obtaining a color profile associated with the second GPU; and (iii) using the color profile to create the transform (e.g., LUT).

In some embodiments, the color profile corresponds to at least one of a generic color profile, a GPU-specific color profile, and a display profile.

In some embodiments, using the color profile to create the LUT involves at least one of using a reference LUT in the color profile as the LUT, and applying a mapping function to the reference LUT to enable the displayed color output from the second GPU to substantially match the displayed color output from the first GPU.

In some embodiments, the mapping function is based on correlations between pixel values in the first GPU, pixel values in the second GPU, and measured output from the display.

In some embodiments, the LUT additionally enables gamma correction for the display.

In some embodiments, the first GPU and the second GPU comprise a low-power GPU which is integrated into a processor chipset and a high-power GPU which resides on a discrete GPU chip. The first GPU and the second GPU can have substantially identical circuitry and similar capabilities, or dissimilar circuitry and/or capabilities. Alternatively, the first GPU and/or the second GPU can be a general-purpose CPU which executes graphics-processing code.

BRIEF DESCRIPTION OF THE FIGURES

In the figures, like reference numerals refer to the same figure elements.

DETAILED DESCRIPTION

Figure 1:
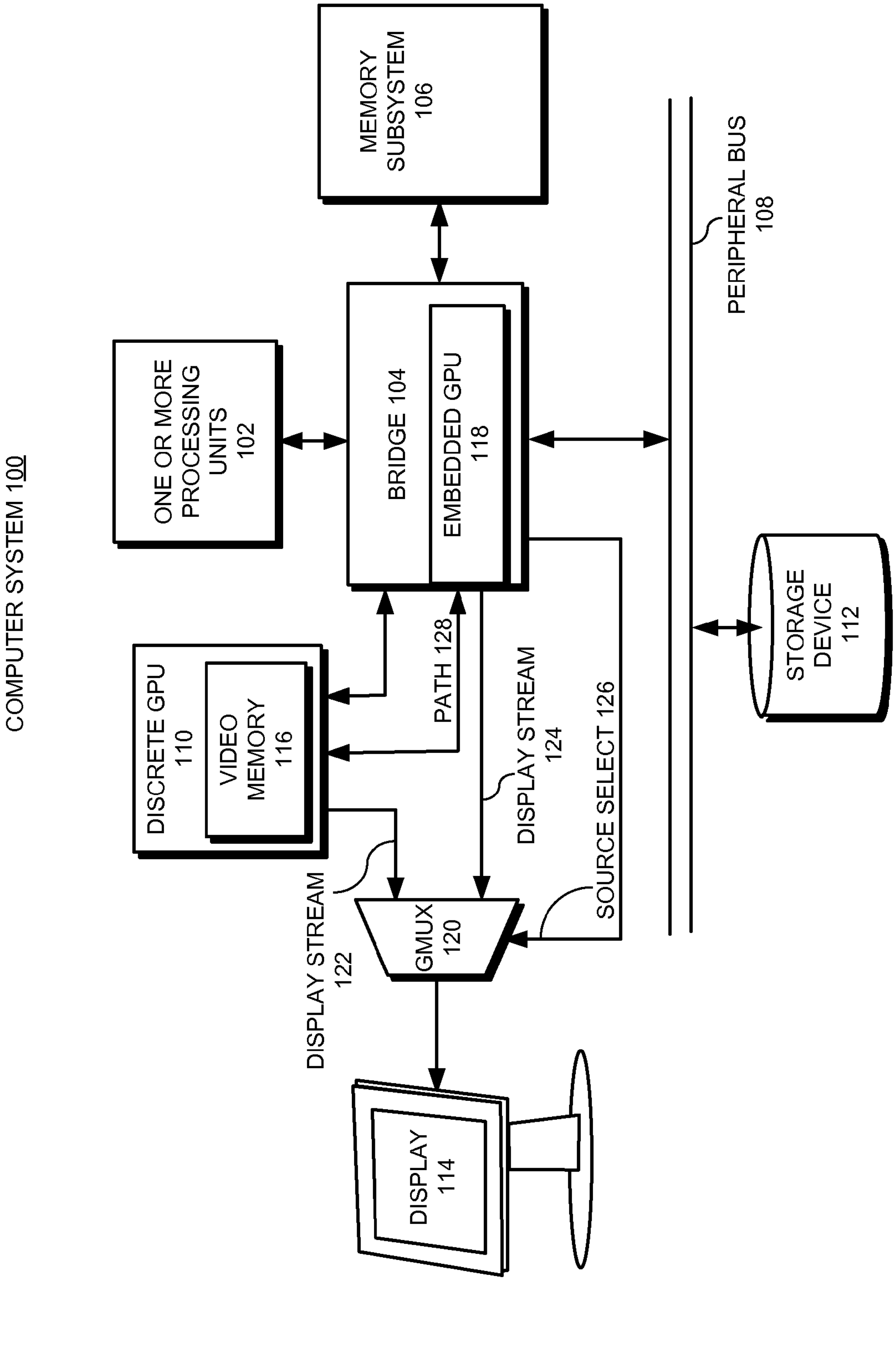
FIG. 1 illustrates a computer system which can switch between different graphics sources to drive the same display in accordance with one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

One embodiment provides a method and system for switching between multiple graphics-processing units (GPUs) in a computer system. The computer system may correspond to a laptop computer, personal computer, workstation, and/or portable electronic device containing an embedded GPU and a discrete GPU. The embedded GPU may consume less power than the discrete GPU, while the discrete GPU may provide better graphics performance than the embedded GPU. As a result, the rendering and display of graphics in the computer system may involve a tradeoff between performance and power savings.

More specifically, one embodiment provides color correction during a switch from a first GPU to a second GPU in driving a display for the computer system. The color correction may be provided by determining a lookup table (LUT) that enables the displayed color output from the second GPU to substantially match the displayed color output from the first GPU and loading the LUT into the second GPU for use by the second GPU. The LUT may be determined by identifying the second GPU, obtaining a color profile associated with the second GPU, and using the color profile to create the LUT.

A reference LUT in the color profile may be used as the LUT, or a mapping function may be applied to the reference LUT to enable the displayed color output from the second GPU to substantially match the displayed color output from the first GPU. The mapping function may be based on correlations between pixel values in the first GPU, pixel values in the second GPU, and measured output from the display. Moreover, the mapping function may map pixel values from the first GPU to pixel values from the second GPU that produce the same displayed color output. Alternatively, the mapping function may map output values from the reference LUT to pixel values in the second GPU that produce the same output values in the display. A different mapping function that maps the reference LUT to pixel values in the first GPU that produce the same output values may be applied to the reference LUT during a switch from the second GPU to the first GPU.

FIG. 1 illustrates a computer system 100 in accordance with one embodiment. Computer system 100 may correspond to a personal computer, laptop computer, portable electronic device, workstation, and/or other electronic device that can switch between two graphics sources to drive a display. Referring to FIG. 1, the two graphics sources include (1) a discrete GPU 110 and (2) an embedded GPU 118, each of which can independently drive display 114. The graphics source driving display 114 is determined by GPU multiplexer (GMUX) 120, which selects between GPU 110 and GPU 118. Hence, computer system 100 may use GMUX 120 to select a graphics source based on current operation conditions.

During operation, display stream 122 from discrete GPU 110 and display stream 124 from embedded GPU 118 both feed into data inputs of GMUX 120. Source select signal 126 feeds into a select input of GMUX 120 and determines which one of the two graphics sources will drive display 114. In the illustrated embodiment, source select signal 126 is produced by bridge chip 104, which includes specific logic for generating source select signal 126. (Note that source select signal 126 can also be produced by a logic block other than bridge chip 104. For example, source select signal 126 can be produced by one or more processing units 102.) The display stream from the selected graphics source then feeds into display 114.

In one embodiment, discrete GPU 110 and embedded GPU 118 communicate through data path 128 to synchronize their display streams. Note that synchronizing the display streams can involve synchronizing both the respective timing signals and the respective data signals.

In one embodiment, discrete GPU 110 is a high-performance GPU that consumes a significant amount of power relative to embedded GPU 118, a lower-performance GPU that consumes a smaller amount of power. In this embodiment, when the graphics-processing load is light, the system switches from using discrete GPU 110 to using embedded GPU 118 to drive display 114, and subsequently powers down discrete GPU 110, thereby saving power. On the other hand, when the graphics-processing load becomes heavy again, the system switches graphics sources from embedded GPU 118 back to discrete GPU 110.

Although we have described a system that includes a discrete GPU and an embedded GPU, the disclosed technique can generally work in any computer system comprising two or more GPUs, each of which may independently drive display 114. Moreover, GPUs in the same computer system may have different operating characteristics and power-consumption levels. For example, the computer system may switch between a processor in one or more processing units 102 (e.g., Central Processing Unit (CPU)) and a special-purpose GPU (e.g., discrete GPU 110) to drive display 114. Hence, the disclosed technique is not limited to the specific embodiment illustrated in FIG. 1.

Also note that the above-described process for switching between graphics sources does not involve shutting down or reinitializing the computer system. As a result, the switching process can take substantially less time than it would have if a reinitialization had been required. Consequently, the disclosed technique facilitates rapid and frequent switching between the graphics sources.

Those skilled in the art will appreciate that GPU 110 and GPU 118 may process framebuffer data for driving display 114 in slightly different ways. For example, GPU 110 and GPU 118 may perform gamma correction on the framebuffer data using different lookup tables (LUTs). As a result, the displayed color output of GPU 110 may not match the displayed color output of GPU 118. Spatial and temporal differences (e.g., paths, timing, dithering, etc) in the driving of display 114 by GPU 110 and GPU 118 may further contribute to variations in the displayed color output between GPU 110 and GPU 118. Because such differences in the displayed color output may be noticeable to a user, the graphical performance of computer system 100 may be adversely impacted by switches between GPU 110 and GPU 118 in driving display 114.

To address GPU-based differences in the displayed color output, computer system 100 may execute color-correction code during a switch from a first GPU to a second GPU in driving display 114. (Note that this color-correction code can be executed by a GPU, such as discrete GPU 110 or embedded GPU 118, or alternatively, can be executed by processor in one or more processing units 102. Also, the color-correction code can be stored in storage device 112, or alternatively within non-volatile memory in discrete GPU 110 or embedded GPU 118.) The color-correction code may determine a lookup table (LUT) that enables the displayed color output from the second GPU to substantially match the displayed color output from the first GPU. This LUT may then be loaded into the second GPU for use by the second GPU in driving display 114, thus allowing computer system 100 to switch from the first GPU to the second GPU without a noticeable change in color output from display 114.

In one or more embodiments, the LUT is determined by identifying the second GPU, obtaining a color profile associated with the second GPU, and using the color profile to create the LUT. For example, the color-correction mechanism may obtain information about the second GPU from a window manager in computer system 100 and identify the second GPU as GPU 118. The color-correction mechanism may then obtain the color profile as an International Color Consortium (ICC) profile related to the driving of display 114 by GPU 118.

The LUT may then be created from data in the color profile. For example, a reference LUT stored in the color profile may be used as the LUT for the second GPU. Alternatively, a mapping function may be applied to the reference LUT to enable the displayed color output from the second GPU to substantially match the displayed color output from the first GPU. As mentioned previously, differences in the displayed color output from the two GPUs may result from different frame-buffer-processing mechanisms in the GPUs, as well as spatial and/or temporal characteristics associated with driving display 114 from different GPUs. Consequently, the mapping function may be based on correlations between pixel values in the first GPU, pixel values in the second GPU, and measured output from display 114.

In one or more embodiments, the mapping function is determined during an offline calibration of display 114 by comparing LUTs used by the first and second GPUs (e.g., to perform gamma correction). In particular, a first LUT for the first GPU and a second LUT for the second GPU may be obtained from color profiles for the GPUs. The mapping function may then be determined by analyzing the relationships between entries in the two LUTs. For example, the first LUT may assign the first three gray levels in the first GPU to a single gray level in display 114, while the second LUT may assign the first three gray levels in the second GPU to three distinct gray levels in display 114. The mapping function may thus ensure that the first three gray levels in the second GPU produce pixel values that match those of the first GPU by changing the first three entries in the second LUT to output the single gray level from the first LUT.

However, spatial and/or temporal differences in the driving of display 114 by the first and second GPUs may cause displayed color output variations that are independent of the mapping of pixel values between the first and second LUTs. To address the variations, the offline calibration may also measure the output of display 114 based on pixel values from the first GPU and the second GPU and modify the mapping function based on the measured output. For example, a colorimeter may measure luminosity and chrominance values from display 114 as the range of pixel values in display 114 is outputted by each GPU. Differences in the colorimeter's measurements while the same pixel value is outputted from the first and second GPUs may then be used in the mapping function to produce a closer match between the displayed color outputs of the GPUs.

In one or more embodiments, the mapping function is applied to the reference LUT in real-time during a switch from the first GPU to the second GPU to ensure that noticeable changes in the displayed color output do not occur. As a result, the mapping function may be approximated to facilitate the timely use of the LUT by the second GPU. For example, a complex mapping function may be approximated by selecting a subset of the points in the mapping function and generating a series of simple functions that approximate the mapping function between each pair of points. The simple functions may then be applied to the reference LUT such that the real-time constraint is met and the second GPU is capable of approximating the displayed color output of the first GPU to an acceptable degree.

In one or more embodiments, the reference LUT is specific to a GPU, and the mapping function is applied to the reference LUT only when switching away from the GPU. For example, if the reference LUT is the first LUT, the first LUT may be used by the first GPU without modification, while the mapping function may be applied to the first LUT to create a modified LUT for use by the second GPU.

On the other hand, the reference LUT may be non-GPU-specific. To ensure that the displayed color outputs from the first and second GPUs match, a first mapping function between the first LUT and the reference LUT and a second mapping function between the second LUT and the reference LUT may be determined. The first and second mapping functions may then be applied to the reference LUT to produce modified LUTs for use by the first and second GPUs in driving display 114. Reference LUTs and mapping functions are discussed in further detail below with respect to FIGS. 4-5.

Figure 2:
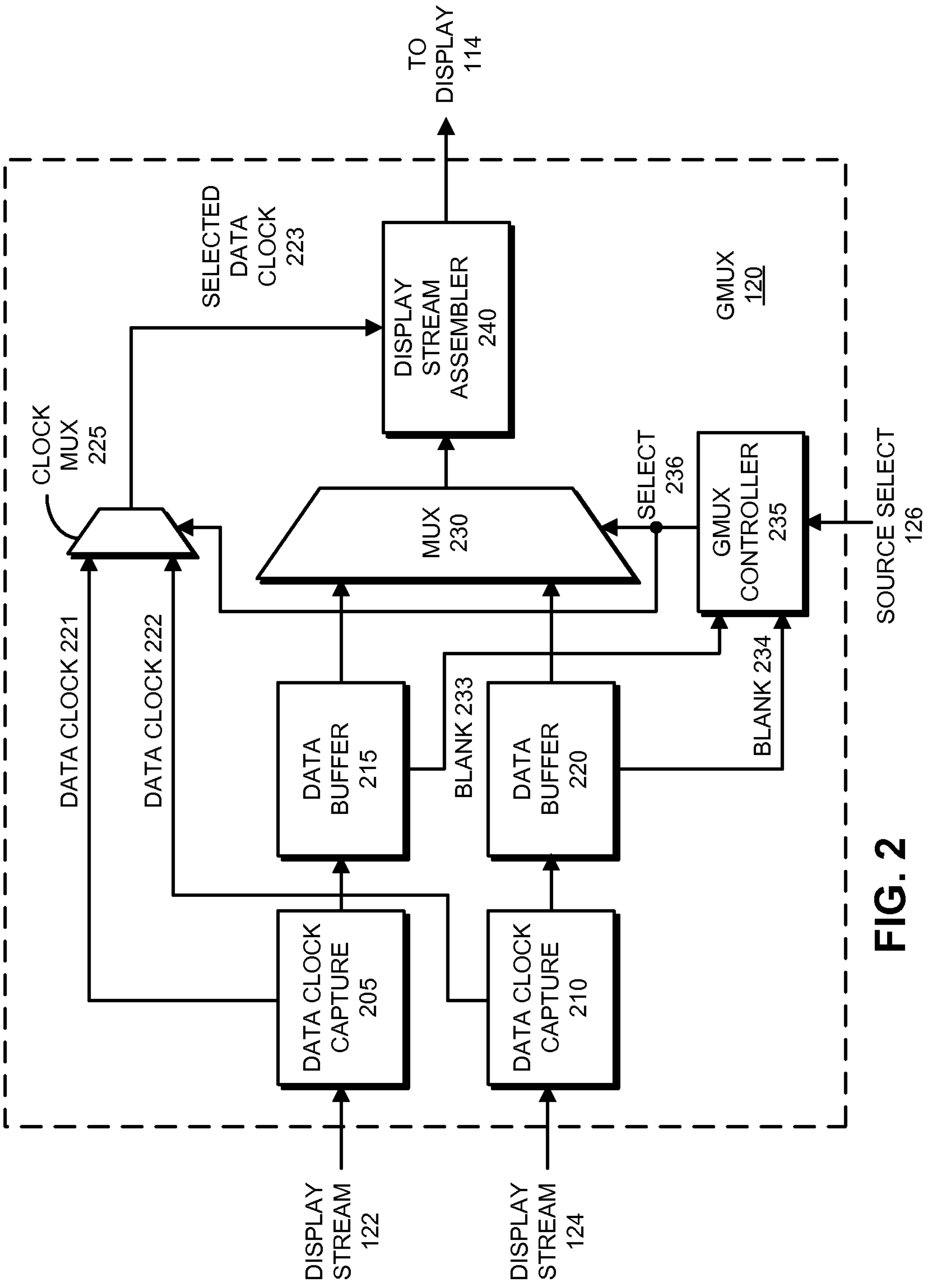
FIG. 2 illustrates the structure of a graphics multiplexer in accordance with one embodiment.

FIG. 2 illustrates the internal structure of the graphics multiplexer 120 (described above with reference to FIG. 1) in accordance with one embodiment. Referring to FIG. 2, display stream 122 from discrete GPU 110 and display stream 124 from embedded GPU 118 feed into data clock capture blocks 205 and 210, respectively. Data clock capture blocks 205 and 210 de-serialize display streams 122 and 124 and also extract respective data clock signals 221 and 222.

These data clock signals 221 and 222 feed into clock MUX 225, which selects one of data clock signals 221 and 222 to be forwarded to display stream assembler 240. In one embodiment, the GMUX controller 235 provides select signal 236 to clock MUX 225. Alternatively, select signal 236 can be provided by other sources, such as processor in one or more processing units 102 or another controller.

Next, display streams 122 and 124, with data clocks separated, feed into data buffers 215 and 220, respectively. Data buffers 215 and 220 examine display streams 122 and 124 to determine when blanking intervals occur, and produce respective blanking interval signals 233 and 234. Data buffers 215 and 220 also produce output data streams that feed into data MUX 230.

Blanking interval signals 233 and 234 feed into GMUX controller 235, which compares blanking intervals 233 and 234 to determine how much overlap, if any, exists between the blanking intervals of display streams 122 and 124. (Note that blanking interval signals 233 and 234 can indicate vertical or horizontal blanking intervals.) If GMUX controller 235 determines that blanking intervals 233 and 234 have a sufficient amount of overlap, GMUX controller 235 asserts select signal 236 as the blanking intervals begin to overlap. This causes clock MUX 225 and data MUX 230 to switch between display streams 122 and 124 during the period when their blanking intervals overlap. Because the switching occurs during the blanking intervals, the switching process will not be visible on display 114.

Finally, the output of data MUX 230 and the selected data clock 223 feed into display stream assembler 240, which re-serializes the data stream before sending the data stream to display 114.

Figure 3:
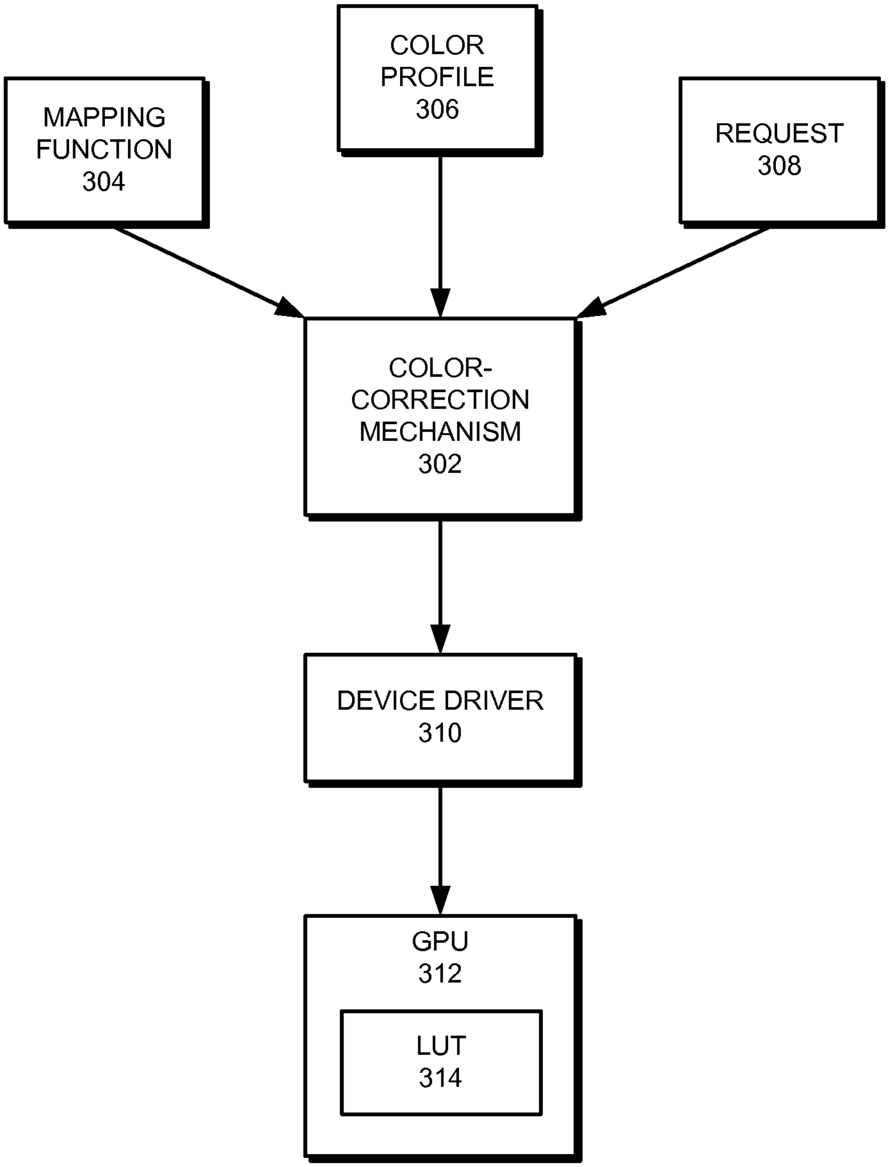
FIG. 3 shows the operation of a color-correction mechanism in a computer system with multiple GPUs in accordance with one embodiment.

FIG. 3 shows the operation of a color-correction mechanism 302 in a computer system with multiple GPUs in accordance with one embodiment. As discussed above, color-correction mechanism 302 may facilitate a seamless switch to a GPU 312 as a signal source for driving the display of the computer system by enabling the displayed color output of GPU 312 to substantially match the displayed color output of a previous GPU from which the switch is being made.

More specifically, color-correction mechanism 302 may create a LUT 314 that allows GPU 312 to generate the same displayed color output as that of the previous GPU. To create LUT 314, color-correction mechanism 302 may identify GPU 312 from a request 308 to switch to GPU 312 as the signal source for driving the display. Next, color-correction mechanism 302 may obtain a color profile 306 associated with GPU 312, such as a GPU-specific color profile, a display profile, and/or a generic profile. For example, color profile 306 may be used by GPU 312 to perform gamma correction for the display.

Color-correction mechanism 302 may then use color profile 306 to create LUT 314. If the reference LUT in color profile 306 is specific to GPU 312, the reference LUT may be used as LUT 314 by GPU 312 without additional modification. On the other hand, if the reference LUT is not specific to GPU 312, color-correction mechanism 302 may apply a mapping function 304 to the reference LUT to create a modified LUT 314. The mapping function may be based on correlations between pixel values in the first GPU, pixel values in the second GPU, and/or measured output from the display. As a result, the mapping function may transform the reference LUT such that the displayed color output of GPU 312 substantially matches the displayed color output of the previous GPU and/or output values stored in a reference LUT for the display.

Once LUT 314 is created, color-correction mechanism 302 may provide LUT 314 to a device driver 310 for GPU 312. Device driver 310 may then load LUT 314 into GPU 312 for use by GPU 312 in driving the display. Because the creation and loading of LUT 314 may occur in real-time, color-correction mechanism 302 may effectively prevent noticeable color changes from occurring with the switch.

Figure 4:
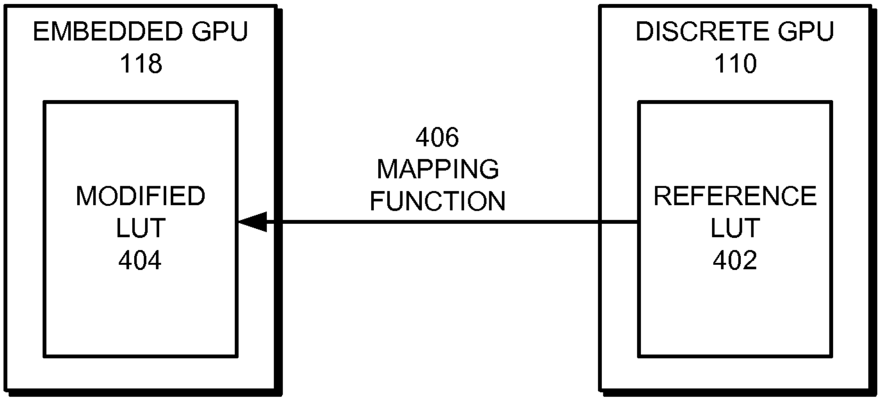
FIG. 4 shows the exemplary use of a mapping function between a discrete GPU and an embedded GPU in accordance with one embodiment.

FIG. 4 shows the exemplary use of a mapping function 406 between a discrete GPU 110 and an embedded GPU 118 in accordance with one embodiment. In particular, mapping function 406 may map pixel values in discrete GPU 110 to pixel values in embedded GPU 118 produce the same displayed color output. Consequently, a reference LUT 402 for a display may be specific to discrete GPU 110, and discrete GPU 110 may use reference LUT 402 to drive the display without modification.

During a switch from discrete GPU 110 to embedded GPU 118, mapping function 406 may be applied to reference LUT 402 to obtain a modified LUT 404. Modified LUT 404 may allow embedded GPU 118 to produce substantially the same displayed color output as discrete GPU 110 using reference LUT 402. Furthermore, because modified LUT 404 is regenerated from reference LUT 402 before every switch to the embedded GPU, changes to reference LUT 402 are automatically mapped to modified LUT 404 and propagated to the output of the display screen by embedded GPU 118. (Note that reference LUT 402 is generated based on characteristics of discrete GPU 110 and the associated display. Hence, reference LUT 402 will be updated when discrete GPU 110 changes or the associated display changes.) Finally, the real-time generation and loading of modified LUT 404 into embedded GPU 118 may facilitate a seamless switch from discrete GPU 110 to embedded GPU 118 in driving the display.

Figure 5:
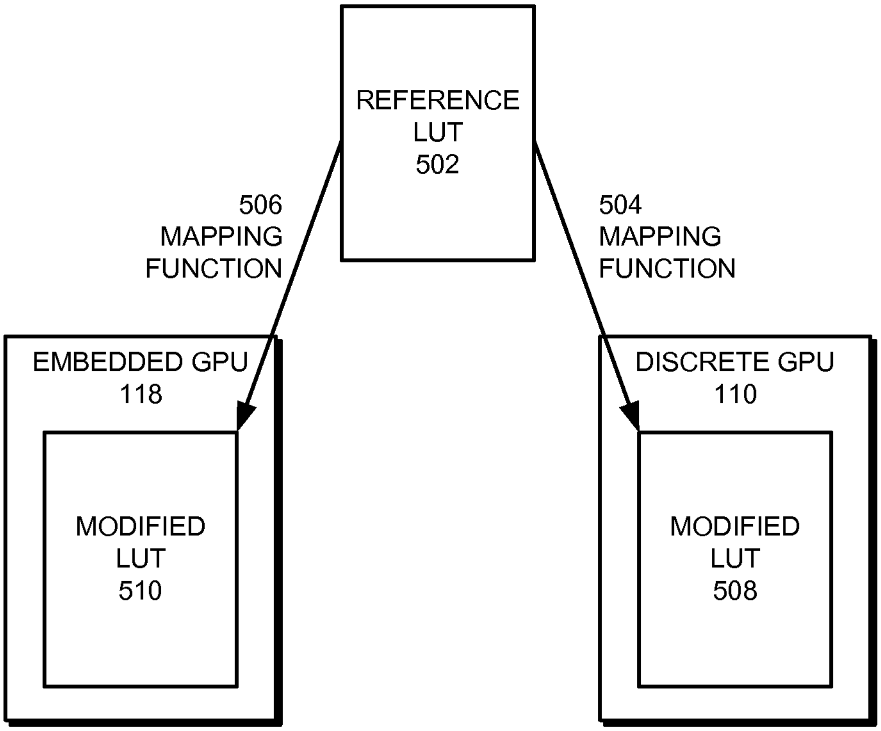
FIG. 5 shows the exemplary use of a non-GPU-specific reference LUT in accordance with one embodiment.

FIG. 5 shows the exemplary use of a non-GPU-specific reference LUT 502 in accordance with one embodiment. For example, reference LUT 502 may be obtained from a display profile and/or a generic color profile that is not specific to a particular device.

To enable matching the displayed color outputs from discrete GPU 110 and embedded GPU 118, a first mapping function 504 between pixel values in discrete GPU 110 and reference LUT 502 and a second mapping function 506 between pixel values in embedded GPU 118 and reference LUT 502 are determined. Mapping function 504 may then be applied to reference LUT 502 to obtain a first modified LUT 508 for use with discrete GPU 110, and mapping function 506 may be applied to reference LUT 502 to obtain a second modified LUT 510 for use with embedded GPU 118. Modified LUTs 508-510 may then be used by discrete GPU 110 and embedded GPU 118 to generate pixel values that produce color outputs matching the values stored in reference LUT 502.

Figure 6:
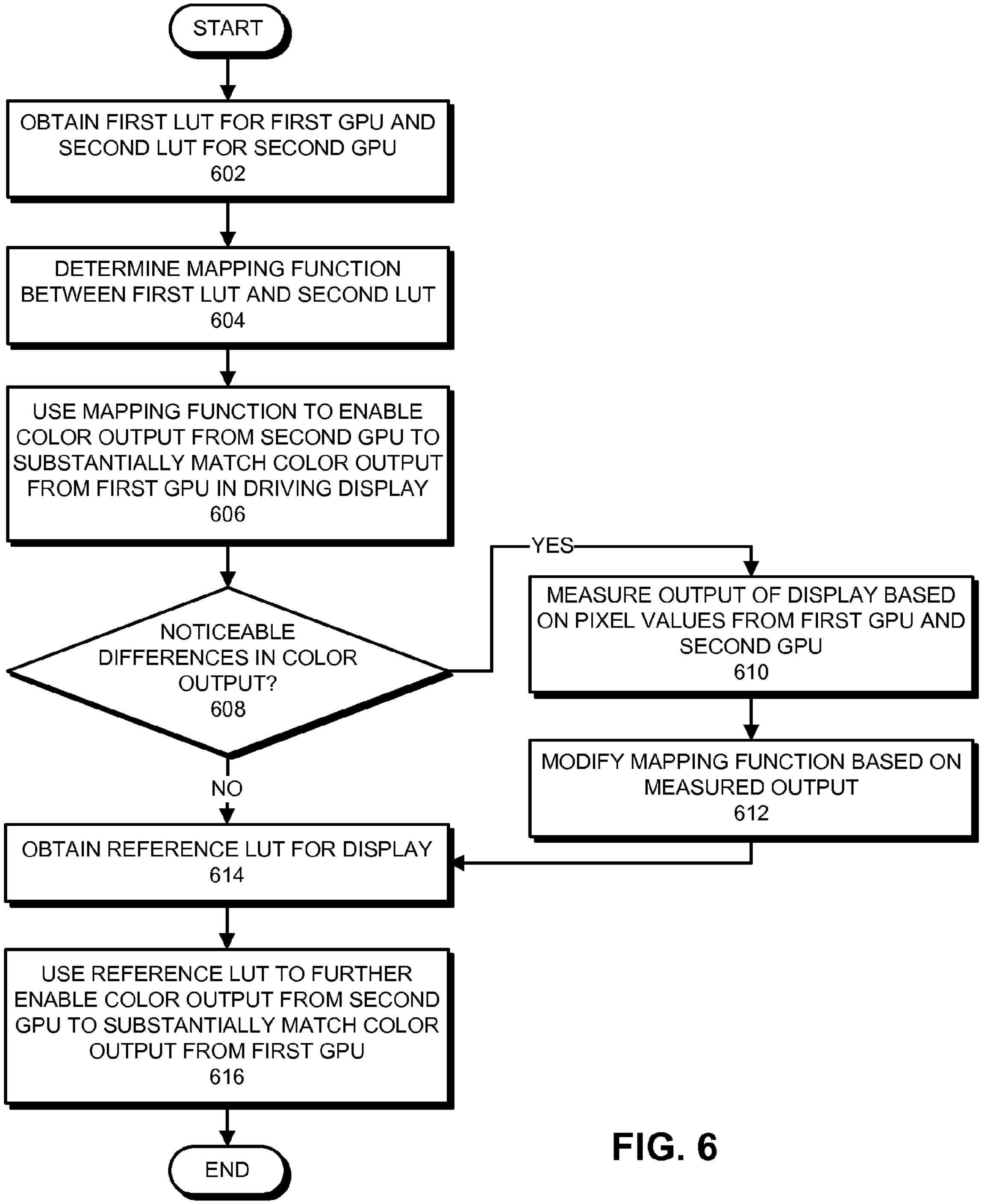
FIG. 6 shows a flowchart illustrating the process of calibrating a display for use with multiple GPUs multiplexer in accordance with one embodiment.

FIG. 6 shows a flowchart illustrating the process of calibrating a display for use with a first GPU and a second GPU in accordance with one embodiment. In one or more embodiments, one or more of the steps may be omitted, repeated, and/or performed in a different order. Accordingly, the specific arrangement of steps shown in FIG. 6 should not be construed as limiting the scope of the embodiments.

The calibration begins with obtaining a first LUT for the first GPU and a second LUT for the second GPU (operation 602). The LUTs may be used by the respective GPUs to perform gamma correction, adjust color temperature, and/or otherwise process framebuffer data used to drive the display. Next, a mapping function between the first LUT and the second LUT is determined (operation 604). The mapping function may be determined by analyzing the relationship between entries from the first LUT and entries from the second LUT.

The mapping function may be used to enable the displayed color output from the second GPU to substantially match the displayed color output from the first GPU in driving the display (operation 606). For example, the mapping function may be applied to the first LUT to create a modified LUT that allows the second GPU to produce substantially the same displayed color output as the first GPU. However, noticeable differences in the displayed color output (operation 608) between the two GPUs may remain after the mapping function is generated. The remaining variations in the displayed color output may stem from spatial and/or temporal differences in the driving of the display by the first and second GPUs.

If noticeable differences are present, the output of the display, as based on pixel values from the first GPU and second GPU, is measured (operation 610), and the mapping function is modified based on the measured output (operation 612). For example, luminosity and chrominance values may be measured from the display as each GPU drives the display with the range of pixel values supported by the display. The mapping function may then be updated based on differences in the measured values for the same pixel value in both GPUs. On the other hand, no additional calibration is needed if the displayed color outputs of the first GPU and second GPU do not contain noticeable differences.

After the mapping function is created and/or modified, a reference LUT for the display is obtained (operation 614). The reference LUT may be specific to either the first GPU or the second GPU (e.g., one of the LUTs obtained in 602), or the reference LUT may be non-GPU-specific. (If the reference LUT is non-GPU-specific, step 604 should be modified to determine a mapping function between the reference LUT and the first LUT, and also to determine a mapping function between the reference LUT and the second LUT.) Finally, the reference LUT may be used to further enable the displayed color output from the second GPU to substantially match the displayed color output from the first GPU (operation 616). For example, the mapping function may be applied to the reference LUT to generate a modified LUT that allows the second GPU to produce the displayed color output that matches that of the first GPU.

Figure 7:
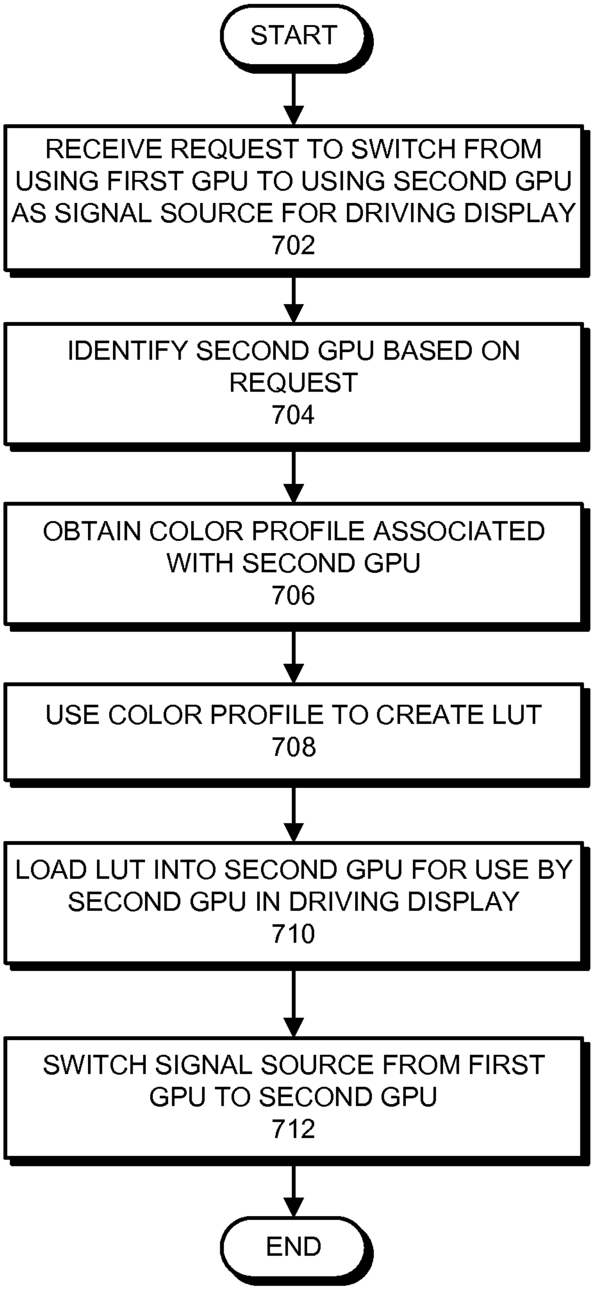
FIG. 7 shows a flowchart illustrating the process of performing color correction during a switch from using a first GPU to using a second GPU to drive a display multiplexer in accordance with one embodiment.

FIG. 7 shows a flowchart illustrating the process of performing color correction during a switch from using a first GPU to using a second GPU to drive a display in accordance with one embodiment. In one or more embodiments, one or more of the steps may be omitted, repeated, and/or performed in a different order. Accordingly, the specific arrangement of steps shown in FIG. 7 should not be construed as limiting the scope of the embodiments.

Initially, a request to switch from using the first GPU to using the second GPU as a signal source for driving the display is received (operation 702). The request may be based on a change in the graphics-processing load associated with driving the display. In response to the request, a LUT that enables the displayed color output from the second GPU to substantially match the displayed color output from the first GPU is obtained. In particular, a precomputed LUT can be obtained from non-volatile storage, or alternatively the LUT may be determined by identifying the second GPU based on the request (operation 704), obtaining a color profile associated with the second GPU (operation 706), and using the color profile to create the LUT (operation 708). For example, the color profile may contain a GPU-specific reference LUT that may be used as the LUT. On the other had, a mapping function may be applied to the reference LUT to enable the displayed color output from the second GPU to substantially match the displayed color output from the first GPU. (Note that instead of computing the LUT at run-time, it is also possible to pre-compute and store a LUT for a specific GPU-display combination.)

Once created, the LUT is loaded into the second GPU for use by the second GPU in driving the display (operation 710). Finally, the signal source is switched from the first GPU to the second GPU (operation 712). Because the LUT is generated and loaded into the second GPU before the switch occurs, the second GPU may produce a displayed color output that matches that of the first GPU immediately after the switch, thus facilitating a seamless switch between the first GPU and the second GPU.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating a switch from using a first graphics-processing unit (GPU) to using a second GPU to drive a display, comprising:
- receiving a request to switch from using a first GPU to using a second GPU as a signal source for driving a display; and
- in response to the request,
  - obtaining a transform that enables a displayed color output from the second GPU to match a displayed color output from the first GPU, the transform comprising a mapping function based on correlations between pixel values in the first GPU, pixel values in the second GPU, and measured output from the display, and
  - enabling the second GPU to use the transform while driving the display.

2. The method of claim 1, wherein the transform comprises a lookup table (LUT).

3. The method of claim 1, wherein obtaining the transform involves:
- identifying the second GPU based on the request;
- obtaining a color profile associated with the second GPU; and
- using the color profile to create a LUT.

4. The method of claim 3, wherein the color profile corresponds to at least one of a generic color profile, a GPU-specific color profile, and a display profile.

5. The method of claim 3, wherein using the color profile to create the LUT involves at least one of:
- using a reference LUT associated with the color profile as the LUT; and
- applying a mapping function to the reference LUT to enable the displayed color output from the second GPU to match the displayed color output from the first GPU.

6. The method of claim 1, wherein the LUT additionally enables gamma correction for the display.

7. The method of claim 1,
- wherein the first GPU and the second GPU comprise a low-power GPU which is integrated into a processor chipset and a high-power GPU which resides on a discrete GPU chip.

8. The method of claim 1, wherein the method further comprises switching from using the first GPU to using the second GPU as a signal source for driving the display, wherein the display streams from the first GPU and the second GPU are synchronized during the switching process.

9. A method for calibrating a display for use with a first graphics-processing unit (GPU) and a second GPU, comprising:
- obtaining a first lookup table (LUT) for a first GPU and a second LUT for a second GPU;
- determining a mapping function between the first LUT and the second LUT, the mapping function based on correlations between pixel values in the first GPU, pixel values in the second GPU, and measured output from a display; and
- using the mapping function to enable a displayed color output from the second GPU to match a displayed color output from the first GPU on the display.

10. The method of claim 9, further comprising:
- measuring the output from the display based on pixel values from the first GPU and the second GPU; and
- modifying the mapping function based on the measured output.

11. The method of claim 9, further comprising:

obtaining a reference LUT for the display; and using the reference LUT to further enable the displayed color output from the second GPU to match the displayed color output from the first GPU.

12. The method of claim 11, wherein determining the mapping function between the first LUT and the second LUT comprises determining a first mapping function between the first LUT and the reference LUT and a second mapping function between the second LUT and the reference LUT, and wherein using the reference LUT to further enable the displayed color output from the second GPU to match the displayed color output from the first GPU involves:

applying the first mapping function to the reference LUT to obtain a first modified LUT for use with the first GPU, and applying the second mapping function to the reference LUT to obtain a second modified LUT for use with the second GPU.

13. The method of claim 11, wherein the reference LUT corresponds to the first LUT.

14. The method of claim 13, wherein additionally using the reference LUT to enable the displayed color output from the second GPU to match the displayed color output from the first GPU involves:

configuring the first GPU to drive the display using the first LUT;

applying the mapping function to the first LUT to obtain a modified LUT; and configuring the second GPU to drive the display using the modified LUT.

15. A computer system that switches from a first graphics processor to a second graphics processor to drive a display, comprising:

a first graphics processor (GPU);

a second GPU; and a display communicatively coupled to the first GPU and the second GPU, wherein upon receiving a request to switch from using the first GPU to using the second GPU as a signal source for driving the display, the computer system is configured to switch the signal source which drives the display from the first GPU to the second GPU; and color-correction code configured to obtain a transform that enables a displayed color output from the second GPU to match a displayed color output from the first GPU, in response to a request to switch from using the first GPU to using the second GPU as a signal source for driving the display, the transform comprising a mapping function based on correlations between pixel values in the first GPU, pixel values in the second GPU, and measured output from the display.

16. The computer system of claim 15, wherein the transform comprises a lookup table (LUT).

17. The computer system of claim 15, wherein obtaining the transform involves:

identifying the second GPU based on the request;

obtaining a color profile associated with the second GPU; and using the color profile to create a LUT.

18. The computer system of claim 17, wherein the color profile corresponds to at least one of a generic color profile, a GPU-specific color profile, and a display profile.

19. The computer system of claim 17, wherein using the color profile to create the LUT involves at least one of:

using a reference LUT in the color profile as the LUT; and applying a mapping function to the reference LUT to enable the displayed color output from the second GPU to match the displayed color output from the first GPU.

20. The computer system of claim 15, wherein the first GPU and the second GPU comprise a low-power GPU which is integrated into a processor chipset and a high-power GPU which resides on a discrete GPU chip.

21. The computer system of claim 15 wherein the computer system is configured to synchronize display streams from the first GPU and the second GPU during the switching process.

22. A non-transitory computer-readable storage medium storing instructions that when executed by a computer cause the computer to perform a method for facilitating a switch from using a first graphics-processing unit (GPU) to using a second GPU to drive a display, the method comprising:

obtaining a transform that enables a displayed color output from a second GPU to match a displayed color output from a first GPU, in response to receiving a request to switch from using the first GPU to using the second GPU as a signal source for driving a display, the transform comprising a mapping function based on correlations between pixel values in the first GPU, pixel values in the second GPU, and measured output from the display, and enabling the second GPU to use the transform while driving the display.

23. The non-transitory computer-readable storage medium of claim 22, wherein the transform comprises a lookup table (LUT).

24. The non-transitory computer-readable storage medium of claim 22, wherein obtaining the transform involves:

identifying the second GPU based on the request;

obtaining a color profile associated with the second GPU; and using the color profile to create a LUT.

25. The non-transitory computer-readable storage medium of claim 24, wherein the color profile corresponds to at least one of a generic color profile, a GPU-specific color profile, and a display profile.

26. The non-transitory computer-readable storage medium of claim 24, wherein using the color profile to create the LUT involves at least one of:

using a reference LUT in the color profile as the LUT; and applying a mapping function to the reference LUT to enable the displayed color output from the second GPU to match the displayed color output from the first GPU.

27. The non-transitory computer-readable storage medium of claim 22, wherein the LUT additionally enables gamma correction for the display.

28. The non-transitory computer-readable storage medium of claim 22, wherein the method further comprises switching from using the first GPU to using the second GPU as a signal source for driving the display; and wherein the display streams from the first GPU and the second GPU are synchronized during the switching process.

29. A method for facilitating a switch from using a first graphics-processing unit (GPU) to using a second GPU to drive a display, comprising:

receiving a request to switch from using a first GPU to using a second GPU as a signal source for driving the display; and in response to the request, obtaining a transform that enables a displayed color output from the second GPU to match a displayed color output from the first GPU, the transform comprising a mapping function based on correlations between pixel values in the first GPU, pixel values in the second GPU, and measured output from the display, switching from using the first GPU to using the second GPU as a signal source for driving the display, and applying the transform while using the second GPU as a signal source for driving the display.

* * * * *